United States Patent
Thimbleby et al.

(10) Patent No.: US 10,388,055 B2
(45) Date of Patent: Aug. 20, 2019

(54) RENDERING ANIMATED USER INPUT STROKES

(71) Applicant: Apple Inc., Cupertino, CA (US)

(72) Inventors: William J. Thimbleby, Sunnyvale, CA (US); Jennifer P. Chen, San Francisco, CA (US); Peter L. Hajas, San Jose, CA (US)

(73) Assignee: Apple Inc., Cupertino, CA (US)

( * ) Notice: Subject to any disclaimer, the term of this patent is extended or adjusted under 35 U.S.C. 154(b) by 7 days.

(21) Appl. No.: 15/721,688

(22) Filed: Sep. 29, 2017

(65) Prior Publication Data

US 2018/0350124 A1    Dec. 6, 2018

Related U.S. Application Data

(60) Provisional application No. 62/514,760, filed on Jun. 2, 2017.

(51) Int. Cl.
| | |
|---|---|
| *G06F 3/0488* | (2013.01) |
| *G06T 13/80* | (2011.01) |
| *G06T 11/20* | (2006.01) |
| *G06F 17/24* | (2006.01) |

(52) U.S. Cl.
CPC ............ *G06T 13/80* (2013.01); *G06F 17/242* (2013.01); *G06T 11/203* (2013.01); *G06F 3/04883* (2013.01)

(58) Field of Classification Search
None
See application file for complete search history.

(56) References Cited

U.S. PATENT DOCUMENTS

| | | | |
|---|---|---|---|
| 5,613,019 A | 3/1997 | Altman | |
| 7,203,903 B1 | 4/2007 | Thompson | |
| 9,529,463 B1 | 12/2016 | Ramani | |
| 10,082,935 B2 | 9/2018 | Harrison | |
| 10,089,291 B2 | 10/2018 | Tu | |
| 2002/0064308 A1 | 5/2002 | Alman | |
| 2008/0180410 A1 | 7/2008 | McCall | |
| 2011/0235915 A1 | 9/2011 | Yamaguchi | |
| 2011/0249007 A1 | 10/2011 | Kuster | |
| 2011/0310118 A1* | 12/2011 | Asmi | G06F 3/04883 345/619 |
| 2013/0027404 A1 | 1/2013 | Sarnoff | |
| 2013/0069954 A1* | 3/2013 | Tristram | G06T 13/80 345/473 |
| 2016/0342227 A1 | 11/2016 | Natzke | |
| 2017/0278283 A1* | 9/2017 | Bloomfield | G06F 3/04883 |
| 2017/0287172 A1* | 10/2017 | Sykes | G06F 3/04845 |
| 2017/0336939 A1* | 11/2017 | Kim | G06T 11/20 |
| 2018/0107371 A1* | 4/2018 | Spas | G06F 3/04883 |
| 2018/0293689 A1* | 10/2018 | McMullen | G06T 1/20 |

* cited by examiner

*Primary Examiner* — James A Thompson
(74) *Attorney, Agent, or Firm* — Morgan, Lewis & Bockius LLP

(57) ABSTRACT

A device implementing a system for rendering animated user input strokes includes at least one processor configured to receive input stroke data. The at least one processor is configured to render, in a first rendering stage within a frame rendering period, a first portion of the input stroke data. The at least one processor is configured to render, in a second rendering stage within the frame rendering period, a second portion of the input stroke data, the second rendering stage being after, and temporally separate from, the first rendering stage.

20 Claims, 9 Drawing Sheets

RENDERING ANIMATED USER INPUT STROKES

CROSS-REFERENCE TO RELATED APPLICATIONS

The present application claims the benefit of U.S. Provisional Patent Application Ser. No. 62/514,760, entitled "RENDERING ANIMATED USER INPUT STROKES," filed Jun. 2, 2017, which is hereby incorporated herein by reference in its entirety and made part of the present U.S. Utility patent application for all purposes.

TECHNICAL FIELD

The present description relates generally to rendering animated user input strokes, including multi-stage rendering of animated ink that is displayed in conjunction with user input strokes.

BACKGROUND

Electronic devices such as laptops, mobile phones, computers and mobile media devices may include a touchscreen. When drawing on the touchscreen, there may be latency between the time the user touches the screen and when pixels are displayed on screen.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject system provides for animation of user input strokes in real-time (which may be referred to as "animated ink" or "animation of ink"). For example, an animated ink may cause input strokes provided by a user to be rendered with an animation when displayed, such as by causing the thickness of the displayed input strokes to change over time. However, animating input strokes may require additional rendering for each input stroke, e.g., to render the animation. The additional rendering may add latency between the time when the user provides the input stroke data and the time that the corresponding animated input stroke is displayed on the screen.

The subject system minimizes this additional latency by performing the rendering in multiple stages per frame, such as two separate stages per frame. For received input stroke data, the first rendering stage is used to render as much input stroke data as possible at the start of a rendering period of a frame, without waiting for the latest touch data (which may correspond to live input strokes). The second rendering stage is used to render live input strokes, and starts when the latest touch data is received. Thus, since as much rendering as possible is performed during the first rendering stage, less rendering of animated ink (e.g., as little rendering as possible) is left to be performed during the second rendering stage, e.g., towards the end of the rendering period for the frame. By splitting the rendering into two stages per frame, where animation is rendered later for live stroke data but still within the same frame rendering period, it is possible to reduce the latency associated with conventional rendering techniques which may wait for the latest touch data before starting any rendering.

Figure 1:
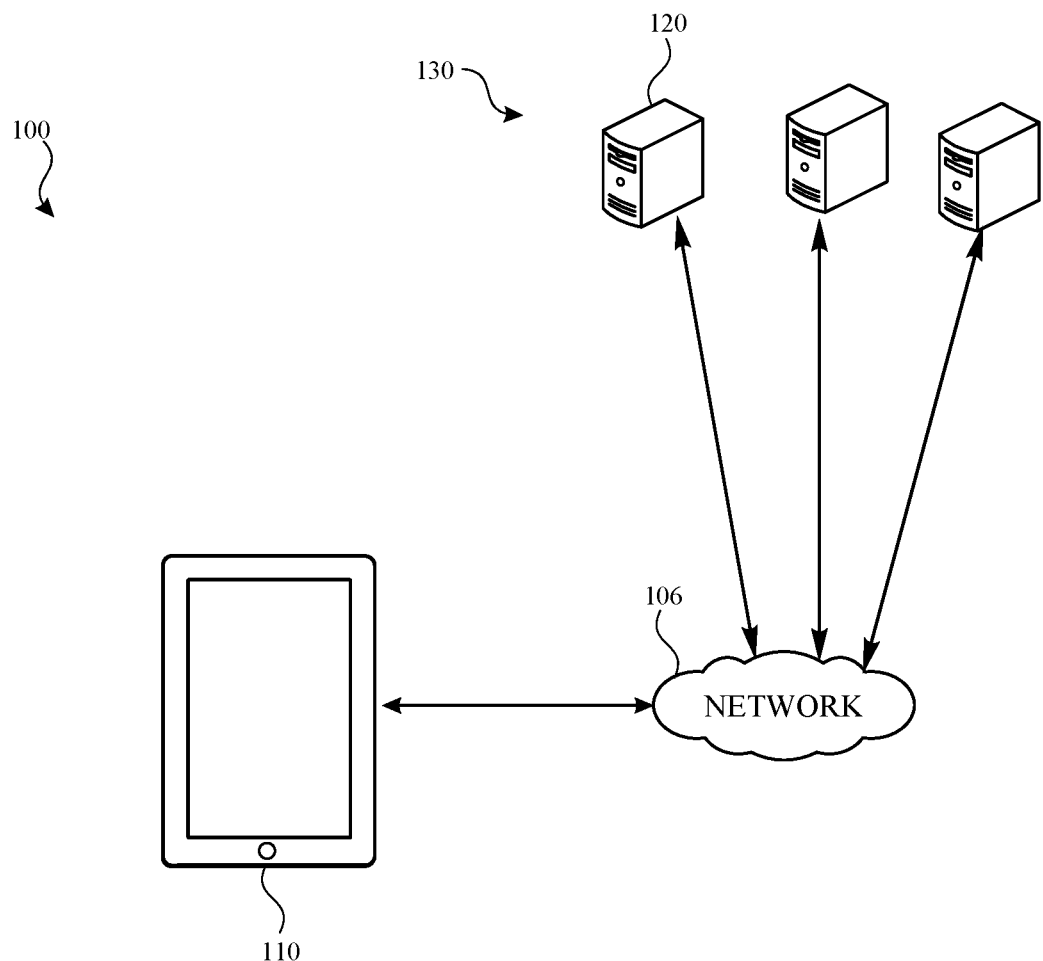
FIG. 1 illustrates an example network environment including an electronic device that may implement the subject system in accordance with one or more implementations.

FIG. 1 illustrates an example network environment including an electronic device 110 that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, and a server 120 that is included in a group of servers 130, such as in a cloud computing or data center implementation. The network 106 may communicatively (directly or indirectly) couple, for example, the electronic device 110 with the server 120 and/or the group of servers 130. In one or more implementations, the network 106 may be an interconnected network of devices that may include, or may be communicatively coupled to, the Internet. For explanatory purposes, the network environment 100 is illustrated in FIG. 1 as including the electronic device 110, the server 120, and the group of servers 130; however, the network environment 100 may include any number of electronic devices and any number of servers or a data center including multiple servers.

The electronic device 110 may include a touchscreen and may be, for example, a portable computing device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in a virtual reality or augmented reality environment. In one or more implementations, the electronic device 110 may include a touchpad. In FIG. 1, by way of example, the electronic device 110 is depicted as a tablet device with a touchscreen. In one or more implementations, the electronic device 110 may be, and/or may include all or part of, the electronic device discussed below with respect to the electronic system discussed below with respect to FIG. 9.

The electronic device 110 may implement the subject system to provide rendering of animation for input strokes via touchscreen. In one or more implementations, the electronic device 110 may include a graphics processing unit (GPU) that is used to perform the rendering of animation for the input strokes. For example, the electronic device 110 may implement the example rendering architecture that is discussed further below with respect to FIGS. 2, 3, 4, and 5A-5B. Examples of rendering of animation for input strokes performed via touchscreen are discussed further below with respect to FIGS. 6-8.

The server 120 and/or the group of servers 130 may store data, such as photos, music, text, web pages and/or content provided therein, etc., that may be accessible on the electronic device 110. In one or more implementations, the server 120 and/or the group of servers 130 may store one or more ink definition formats that may be used to animate user input strokes, such as the ink definition format discussed further below with respect to FIG. 6. The electronic device 110 may retrieve the one or more ink definition formats from the server 120 and/or the group of servers 130, and may apply the ink definition formats to received user input strokes. In one or more implementations, a user may create an ink definition format, e.g. using the electronic device 110, and the electronic device 110 may transmit the ink definition format to the server 120 and/or the group of servers 130. The server 120 and/or the group of servers 130 may allow other users to download the user generated ink definition format.

Figure 2:
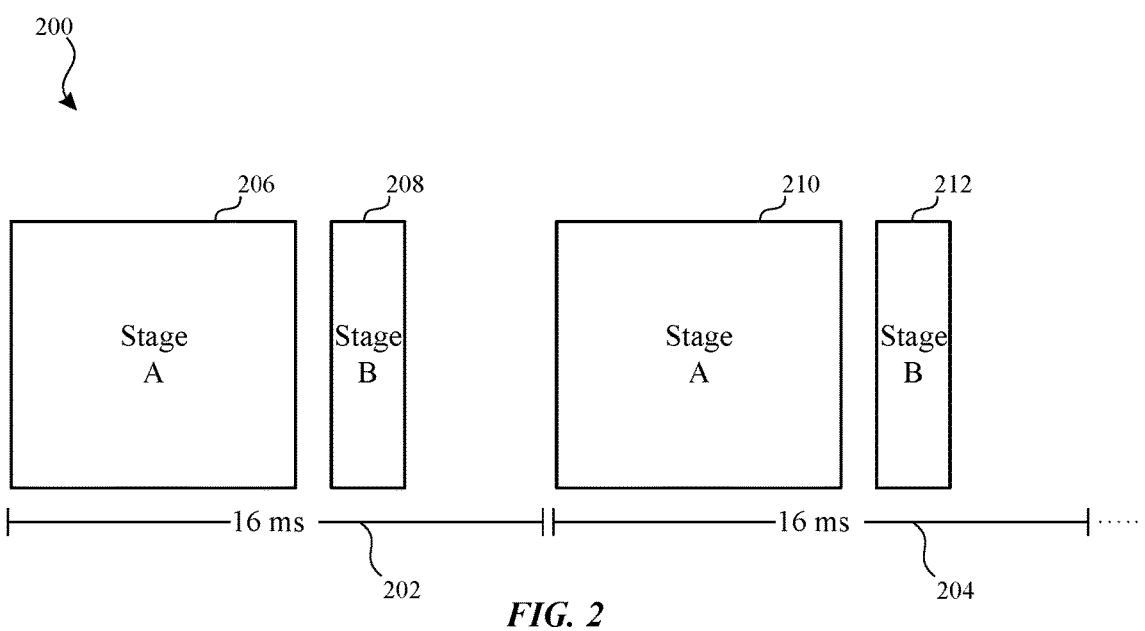
FIG. 2 illustrates an example timing diagram of multi-stage rendering of animated input stroke data in accordance with one or more implementations.

FIG. 2 illustrates an example timing diagram 200 of multi-stage rendering of animated input stroke data in accordance with one or more implementations. For explanatory purposes, the example two stage rendering illustrated in FIG. 2 is described as being performed on the electronic device 110 of FIG. 1. However, the example two stage rendering in FIG. 2 may be performed on any electronic device that includes a touchscreen or any electronic device with a touchpad.

The two stage rendering can reduce latency when rendering animation for user input strokes. As discussed above, latency corresponds to the time when a user's input device (e.g., finger, stylus, digital pen) touches the touchscreen and when pixels are displayed on the touchscreen screen. In an example of high latency, a user draws a stroke and the stroke gets rendered as trailing the user's stroke motion, such that there is a gap between the current position of the input device and the rendered stroke pixels. In an example of lower latency, the user draws a stroke and the stroke gets rendered substantially close to the user's stroke motion and the input device's current position.

With respect to the animation being rendered for the user input strokes, the animation may correspond to different effects applied to the input strokes which are drawn on the touchscreen. In one or more implementations, the thickness of the stroke may change depending on the ink effect selected by the user. For example, with a watercolor effect, the virtual ink as displayed may appear to bleed based on a time function. In another example, a selection marquee may display an animation of pulsing dots for a user-selected region. The rendering and animation effects for ink are discussed further below with respect to FIG. 6.

In one or more implementations, the electronic device 110 receives input stroke data. The input stroke data may be received within an application running on the electronic device 110, or received in association with an operating system of the electronic device 110, such as through an application programming interface (API) or driver. For example, the input stroke data may be received within a word processing application, a drawing application, a notepad application, a calendar application, or any other application which accepts user input in the form of drawing/input strokes. The application may be a standalone application which does not access networked content. Alternatively or in addition, the application may access networked content, for example, content that is stored on the server 120 and/or the one or more servers from the group of servers 130.

The input stroke data may also be received in association with the operating system of the electronic device 110, where the operating system provides a user interface which accepts user input in the form of drawing/input strokes. For example, the operating system may provide such an interface for inputting text, as an alternative to keyboard input.

The electronic device 110 receives the input stroke data and performs two renderings for the input stroke data within each frame rendering period. The timing diagram 200 of FIG. 2 shows frames 202 and 204, with each frame being refreshed every 16 milliseconds (e.g., for a 60 frames per second refresh rate), and with subsequent frames indicated by ellipsis. While FIG. 2 is illustrated with each frame being refreshed every 16 ms, it is understood that the frame rendering period may differ for different refresh rates. The input stroke data received by the electronic device 110 during a given frame rendering period can correspond to live stroke(s) in which the user is currently touching the touchscreen with the input device, non-live stroke(s) in which the user has completed stroke input and is not touching the touchscreen with the input device, or a combination of live strokes and non-live strokes.

In this regard, the user of the electronic device 110 may input stroke data by using one or more input devices. Examples of input devices include, but are not limited to, a finger of the user, a stylus or a digital pen. Furthermore, different touchscreen input sampling rates may be associated with the different types of input devices and/or the different types of electronic devices 110. For example, the electronic device 110 may have a touchscreen sampling rate of 60 or 120 samples per second when using a finger or stylus as the input device. Alternatively or in addition, the electronic device 110 may have a touchscreen sampling rate of 240 samples per second when using a digital pen (e.g., which is programmed specific to the electronic device 110) as the input device. Alignment of the sampling rate with the frame refresh rate may be automatic on the electronic device 110, or may be configurable by the user.

The electronic device 110 renders the input stroke data within two stages, namely stage A and stage B, on a per-frame basis. In the example of FIG. 2, a first rendering stage 206 (stage A) and a second rendering stage 208 (stage B) occur for the frame 202. The second rendering stage 208 is after, and temporally separate from, the first rendering stage 206. In addition, a respective first rendering stage 210 (stage A) and second rendering stage 212 (stage B) occur for the frame 204, where the second rendering stage 212 is after, and temporally separate from, the first rendering stage 210.

During the stage A, the electronic device 110 renders a first portion of the input stroke data. The first rendering stage is triggered when the period for rendering the frame starts, for example, at the vertical synchronization of the touchscreen for the frame. Once the period for rendering the frame starts, the electronic device 110 renders as much data as possible for the input stroke data. In one or more implementations, the first portion of the input stroke data includes immutable stroke data which may be input stroke data that has not been animated. The first portion of the input stroke data may also include non-live stroke input. The rendering of the immutable stroke data and of the non-live stroke data is discussed further below with respect to FIG. 3.

During stage B, the electronic device 110 renders a second portion of the input stroke data. The second rendering stage is triggered when the latest touch data (e.g., corresponding to what is currently being drawn) becomes available, such as based on the touchscreen or input device sampling rate. When such data becomes available, the electronic device 110 renders that portion (e.g., the second portion) of the input stroke data. In one or more implementations, the second portion of the input stroke data corresponds to live stroke input data, such as input stroke data that was received since the start of the rendering period for the frame. The second portion of the input stroke data may comprise mutable stroke data which corresponds to the animation for the input stroke data. The rendering of the live stroke input and of the mutable stroke data is discussed further below with respect to FIGS. 4A-4B.

As seen in FIG. 2, the duration of the first rendering stage (e.g., stage A) may be greater than the duration of the second rendering stage (e.g., stage B). By virtue of rendering as much as possible during the first rendering stage and rendering a smaller amount (e.g., live stroke data) during the second rendering stage, it is possible to achieve lower latency, e.g., by not waiting for latest touch data before rendering the first rendering stage (e.g., stage A).

In one or more implementations, the electronic device 110 may determine that the user has completed stroke input before the end of the rendering period for the frame 202, for example, when the sampling rate for the touchscreen is faster than the refresh rate for the display. The electronic device 110 may render the subsequent input stroke data within the rendering period for the frame 202 (e.g., instead of rendering the subsequent input stroke data within the frame 204). The rendering of the subsequent input stroke data is discussed further below with respect to FIG. 5.

In one or more implementations, the electronic device 110 may implement predictive rendering. In particular, the electronic device 110 may predictably determine what an input stroke will look like in 16 ms time, and perform rendering based on the prediction. Furthermore, the electronic device 110 may predictably determine how a stroke may look after a critical time (e.g., based on a predefined threshold) has passed. For example, a drawing that the user had done in animated ink may have been saved in memory. To render a thumbnail of that drawing, the electronic device 110 would not need to render the animation and wait for it the animation to finish. Rather, the electronic device 110 may calculate when the input stroke(s) would come to rest, and animate then.

FIGS. 3, 4A-4B and 5 illustrate an example framebuffer configuration 300 for different rendering stages of a system for rendering animated input stroke data in accordance with one or more implementations. Not all of the depicted components may be used in all implementations, however, and one or more implementations may include additional or different components than those shown in the figures. Variations in the arrangement and type of the components may be made without departing from the spirit or scope of the claims as set forth herein. Additional components, different components, or fewer components may be provided. In one or more implementations, the framebuffer configuration 300 may be locally implemented by the electronic devices 110 to provide a system for rendering input stroke data.

The framebuffer configuration 300 includes an accumulator framebuffer 302, a paint framebuffer 304 and a back framebuffer 306. The accumulator framebuffer 302 accumulates immutable paint during drawing. The paint framebuffer 304 stores the mutable part of the stroke being drawn. The back framebuffer 306 stores a transparent rendered version of all previous strokes. FIGS. 3, 4, 5A and 5B also illustrate layer 308, corresponding to the rendering of ink for display on the electronic device 110.

The electronic device 110 utilizes the accumulator framebuffer 302, the paint framebuffer 304 and the back framebuffer 306 based on a rendering list, which corresponds to a list of animating strokes for rendering. The final stroke in the rendering list can be live if the user is currently drawing it.

Figure 3:
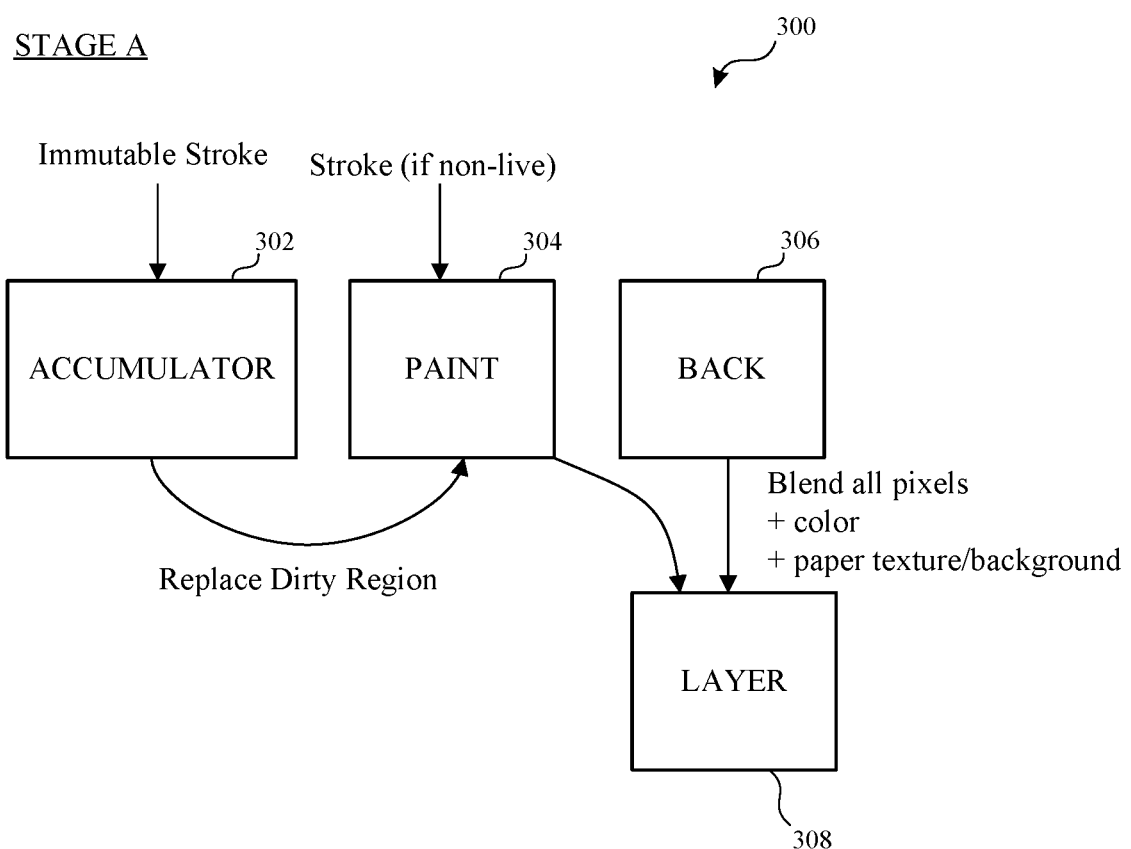
FIG. 3 illustrates an example framebuffer configuration for rendering animated input stroke data with respect to a first of two stages, in accordance with one or more implementations.

FIG. 3 illustrates the framebuffer configuration 300 with respect to the first stage of rendering (e.g., stage A, corresponding to stages 206, 210 of FIG. 2), in accordance with one or more implementations. In stage A, any newly immutable part of a first stroke by the user is accumulated in the accumulator framebuffer 302. An immutable part of the stroke corresponds to input stroke data which cannot be modified. In other words, the immutable part of the input stroke data may correspond to the representation of input stroke input without animation.

After the accumulator framebuffer 302 accumulates the immutable stroke data, a dirty part of the paint framebuffer 304 is replaced with the accumulator framebuffer 302. The dirty part of the paint framebuffer 304 corresponds to those sections (e.g., rectangles) of the display that are being changed.

In a case where the first input stroke is not live (e.g., where the user is currently not drawing), the remainder of the stroke is rendered into the paint framebuffer 304. The entirety of the layer 308 is drawn, compositing the current paint framebuffer 304 on top of the back framebuffer 306, and over a paper texture/background image. Thus, stage A corresponds with rendering a newly immutable part of a first stroke and, if the first input stroke is not live, rendering the remainder of that stroke. As noted above, such rendering may include animating of ink for the input stroke data.

If the rendering of the animation for the input stroke has finished, the electronic device 110 composites the paint framebuffer 304 on top of the back framebuffer 306, and clears the accumulator framebuffer 302.

Figure 4A:
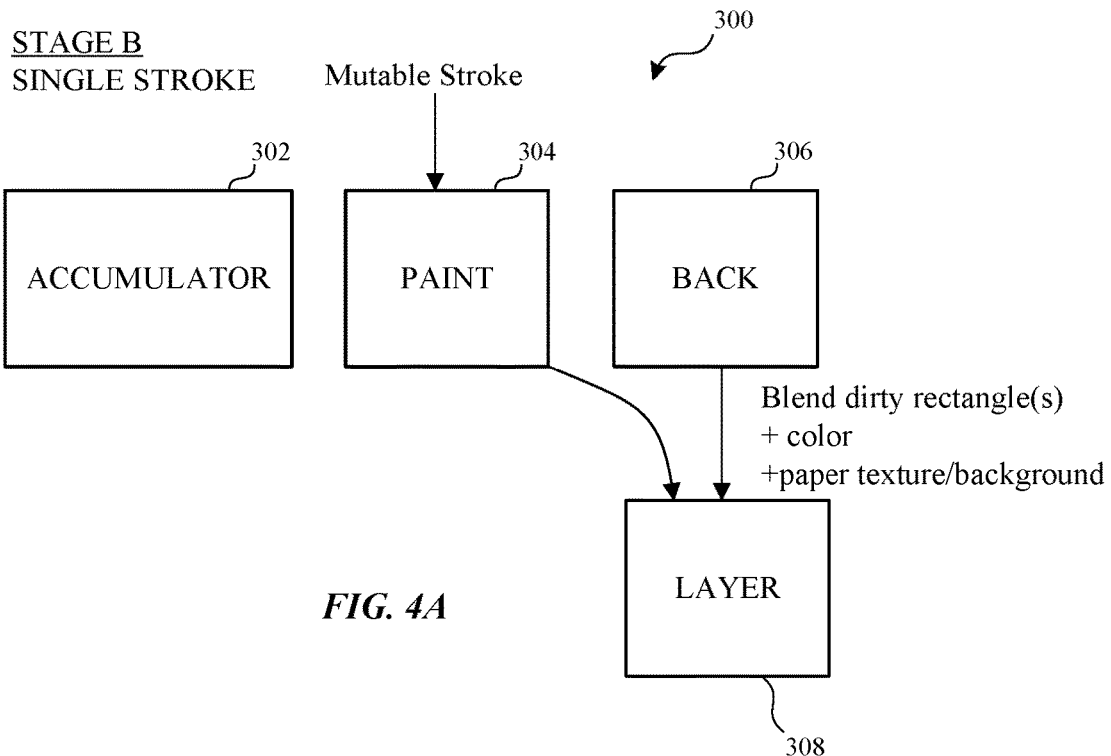
FIGS. 4A-4B illustrate an example framebuffer configuration for rendering animated input stroke data with respect to a second of two stages, in accordance with one or more implementations.
Figure 4B:
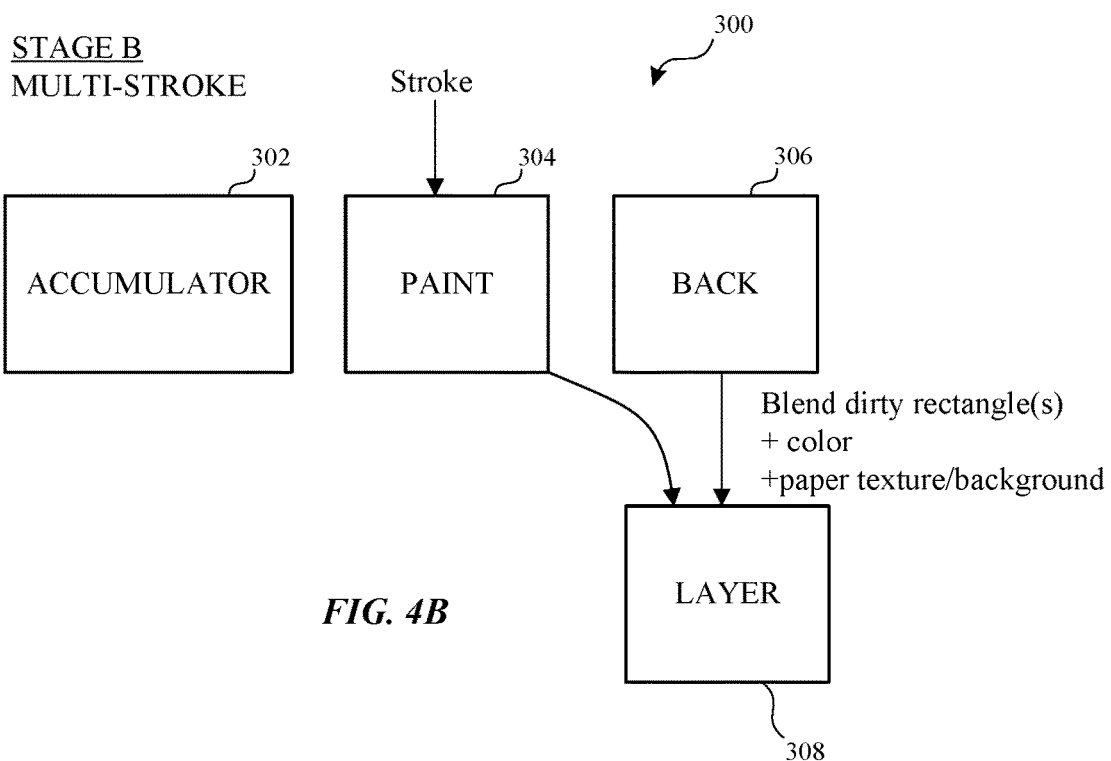

FIGS. 4A-4B illustrate the framebuffer configuration 300 with respect to the second stage of rendering (e.g., stage B, corresponding to stages 208, 212), in accordance with one or more implementations. In one or more implementations, Stage B occurs when there is a live stroke (e.g., when the final stroke in the rendering list is live). As seen in FIGS. 4A-4B, the rendering differs with respect to the framebuffer configuration 300 based on whether the live stroke corresponds to a single stroke or a multi-stroke.

In FIG. 4A, corresponding to a live single stroke, the new, mutable part of the stroke is drawn in the paint framebuffer 304. The mutable part of the stroke corresponds to input stroke data which can be modified. In other words, the mutable part of stroke data may correspond to the representation of stroke input that includes animation. Further, the dirty part of the paint framebuffer 304 is composited on top of the back framebuffer 306, and over a paper texture/background image into the layer 308. In this regard, double blending may be avoided since the accumulator framebuffer 302 has already composited into the layer 308, as described above with respect to stage A.

In FIG. 4B, the live stroke is part of multi-stroke input. In FIG. 4B, the entirety of the live stroke is drawn in the paint framebuffer 304. Further, the dirty part of the paint framebuffer 304 is composited into the layer 308.

Thus, FIGS. 4A-4B illustrate that when the rendering list includes a live stroke, the live stroke can be rendered with animation within a rendering period of a single frame (e.g., frame 202). In this way, latency can be lowered for animating ink for input strokes.

Figure 5:
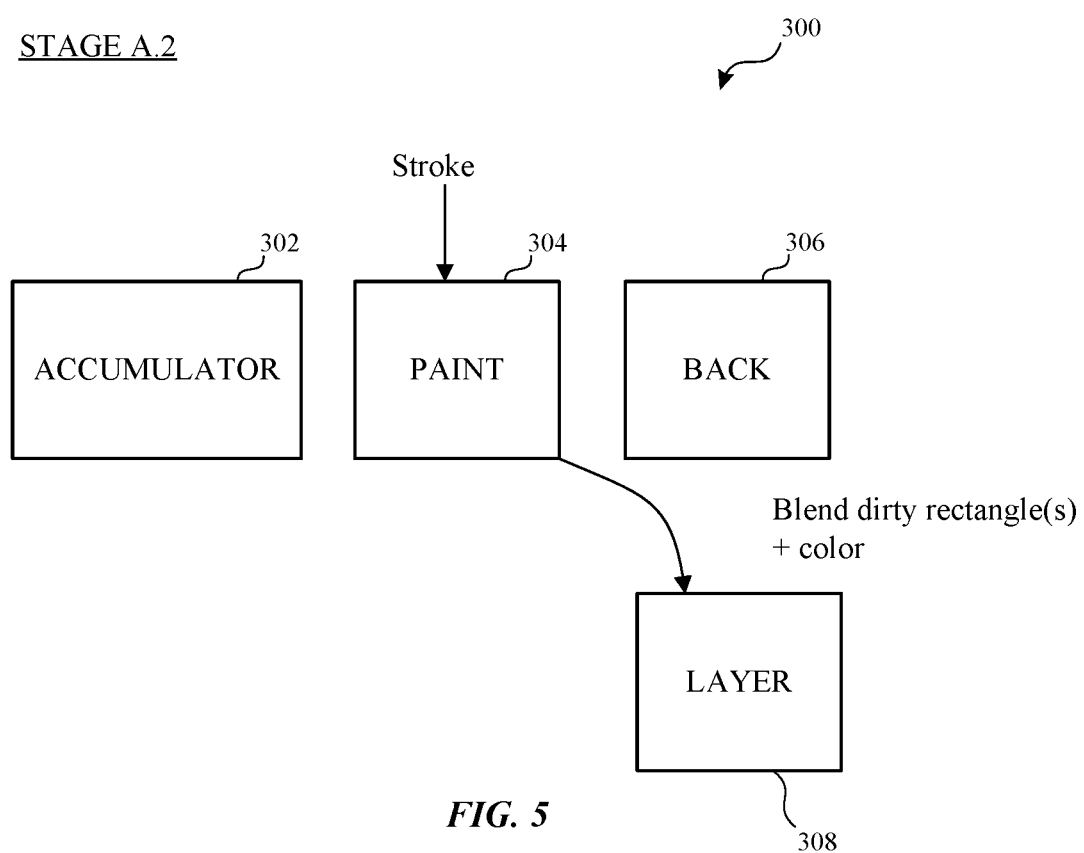
FIG. 5 illustrates an example framebuffer configuration for rendering subsequent animated input stroke data within a frame rendering period, in accordance with one or more implementations.

FIG. 5 illustrates the framebuffer configuration 300 with respect to rendering subsequent input stroke data within the same frame rendering period (e.g., corresponding to frame 202 of FIG. 2), in accordance with one or more implementations. The electronic device 110 may determine that the user has completed stroke input before the end of the frame rendering period. For example, with respect to the frame 202, the user may complete stroke input before the end of the frame rendering period. The electronic device 110 may detect that there is a threshold amount of time remaining within the frame rendering period for rendering subsequent input stroke data, and may render such subsequent input stroke data within the frame rendering period for the frame 202 (e.g., instead of rendering the subsequent input stroke data within the frame rendering period for the frame 204).

In the example of FIG. 5, the additional rendering stage is depicted as stage A.2, as it is in addition to the stage A (e.g., stage 206). Each subsequent non-live stroke is rendered using a method similar to the Stage B multi-stroke example described above, but can be rendered in Stage A ahead of time. As shown in FIG. 5, each subsequent non-live stroke is fully rendered in the paint framebuffer 304. The stroke bounds are cropped, for example, by compositing the dirty part of the paint framebuffer 304 into the layer 308. In addition, the paint framebuffer 304 is cleared.

Figure 6:
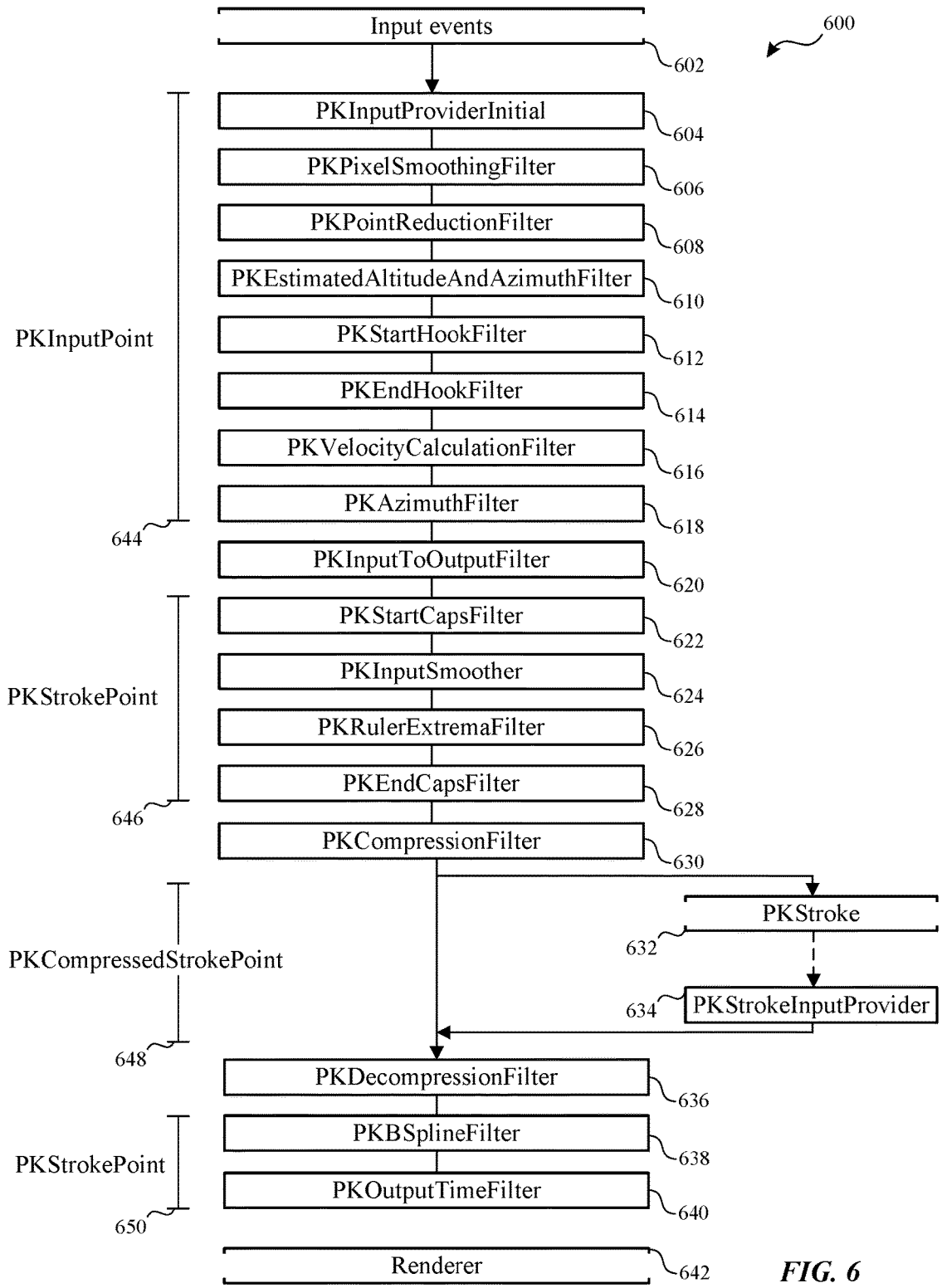
FIG. 6 illustrates an example of an ink definition format that may be used to render animated user input strokes in accordance with one or more implementations.

FIG. 6 illustrates an example of an ink definition format 600 that may be used to render animated user input strokes in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. In one or more implementations, the ink definition format 600 may be locally implemented by the electronic device 110, such as by a graphics processing unit (GPU), to indicate how animated ink should be rendered.

In the example of FIG. 6, the ink definition format 600 is implemented as a stack of operations that may be applied to input strokes in order to render animated ink for input strokes. The stack provides the user (e.g., a developer) with the ability to define how each input stroke will look (e.g., watercolor vs. regular ink). In addition, the ink definition format 600 provides for changing how inks within an application are used on the electronic device 110. The operations applied by the ink definition format 600 to input stroke data can be rendered in real time.

The ink definition format 600 provides for a user to procedurally generate ink, while maintaining the original input stroke data. For example, raw input data such as speed, tilt, time, acceleration, azimuth, force and/or pressure can be determined from input strokes and stored together with the input stroke data. The raw input data may be compressed before being saved. Further, ink parameters such as opacity, color, thickness, radius, width, as well as other parameters, can be generated (e.g., as metadata). These ink parameters can be applied to an input stroke and its raw data (e.g., which requires uncompressing the raw data), for rendering animation in a user-selectable manner.

For example, a user may select a first ink, with a predefined curve, a predefined force curve, and/or a combination thereof, and apply that ink to input stroke data in order to animate the input stroke. Thus, the rendering and presentation of the ink is separated from the input stroke data, and the original input stroke data is maintained and would still be available for the user. The use could then select a second ink, apply it to the input stroke data, and have the input stroke rendered in a different manner, based on the second new ink. For example, the first and second inks may have different pressure curves and/or force curves associated therewith, such that the different pressure curves and/or force curves effect rendering (e.g., thickness, opacity) in different manners.

The ink definition format 600 is illustrated in FIG. 6 as a filter stack, which begins with input events 602 and ends with renderer 642. There are three types of data that flow through the stack. These types of data are used in four stages 644, 646, 648 and 650, with conversion filters between the stages. PKInputPoint 644 represents the first stage and corresponds with raw input data filtering, with PKInputToOutputFilter 620 representing a conversion stage. PKStrokePoint 646 represents the second stage and corresponds with rendering data filtering, with PKCompressionFilter 630 representing a conversion stage. PKCompressedStrokePoint 648 represents the third stage and corresponds with storage, with PKDecompressionFilter 636 representing a conversion stage. PKStrokePoint 650 represents the fourth stage and corresponds with rendering the input strokes.

Input events 602 represents receiving point input (input stroke data), such as from a touchscreen or other input devices. The first stage of PKInputPoint 644, corresponding with raw input data filtering, may include one or more of the following:

PKInputProviderInitial 604 which represents a queue of initial points;
PKPixelSmoothingFilter 606 which represents a minor smoothing to remove pixel aliasing of finger touch events;
PKPointReductionFilter 608 which represents dynamic programming polygon fitting to remove extra point data;
PKEstimatedAltitudeAndAzimuthFilter 610 which represents backfilling azimuth/altitude when valid values are available;

PKStartHookFilter 612 which represents removing finger created hooks at the start of stroke;

PKEndHookFilter 614 which represents removing finger created hooks at the end of stroke;

PKVelocityCalculationFilter 616 which represents calculating velocity of the stroke; and PKAzimuthFilter 618 which represents generating azimuth data for the input device (e.g., finger, stylus) from an initial direction.

The conversion stage of PKInputToOutputFilter 620 represents applying ink to convert from force/azimuth to radius/opacity. The second stage of PKStrokePoint 646, corresponding with rendering data filtering, may include one or more of the following:

PKStartCapsFilter 622 which represents modifying the opacity at the start of a stroke;

PKInputSmoother 624 which represents smoothing using curvature b-spline fitting;

PKRulerExtremaFilter 626 which represents ensuring that the extrema of input on a ruler is not smoothed; and PKEndCapsFilter 628 which represents modifying the opacity at the end of a stroke.

The conversion stage of PKCompressionFilter 630 represents compressing the point information. The third stage of PKCompressedStrokePoint 648, corresponding with storage, may include one or more of the following:

PKStroke 632 which represents permanent storage; and

PKStrokeInputProvider 634 which represents loading permanent storage.

In one of more implementations, compression is always performed, even if the data is goes straight to the renderer, so that what is rendered is identical to what will be replayed when loading data from the PKStroke 632.

The conversion stage of PKDecompressionFilter 636 represents decompressing the point information. The fourth stage of PKStrokePoint 650, corresponding with rendering the input strokes, may include one or more of the following:

PKBSplineFilter 638 which represents interpolating data with a b-spline; and PKOutputTimeFilter 640 which represents modifying time dependent properties.

Renderer 642 represents rendering the point data based on the above-described stack operations. Thus, the filter stack depicted in FIG. 6 provides for procedurally rendering ink while maintaining the original input stroke data. In this manner, users can create different functions of the original input stroke data to generate different ink animations.

Figure 7:
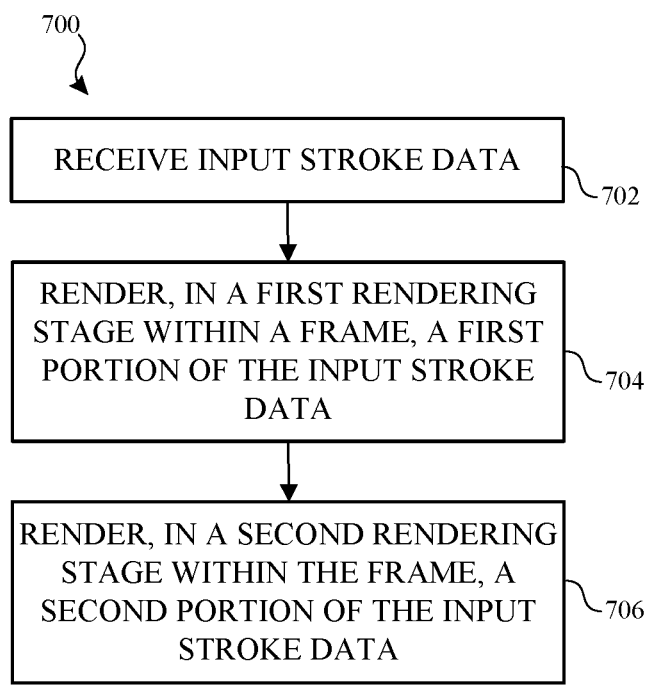
FIG. 7 illustrates a flow diagram of an example process for multi-stage rendering of animated user input strokes in accordance with one or more implementations.

FIG. 7 illustrates a flow diagram of an example process 700 for multi-stage rendering of animated user input strokes in accordance with one or more implementations. For explanatory purposes, the process 700 is primarily described herein with reference to the electronic device 110 of FIG. 1. However, the process 700 is not limited to the electronic device 110 of FIG. 1, and one or more blocks (or operations) of the process 700 may be performed by one or more other components of the electronic device 110. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The electronic device 110 receives input stroke data (702). The electronic device 110 renders, in a first rendering stage within a frame rendering period, a first portion of the input stroke data (704). The first rendering stage may be triggered when the frame rendering period starts (e.g., on vertical synchronization). The first portion of the input stroke data may include immutable stroke data which corresponds to stroke data which has not been animated.

The electronic device 110 renders, in a second rendering stage within the frame rendering period, a second portion of the input stroke data, the second rendering stage being after, and temporally separate from, the first rendering stage (706). A duration of the second rendering stage may be shorter than a duration of the first rendering stage.

The second rendering stage may be triggered when latest touch data corresponding to the second portion of the input stroke data becomes available and/or is received. The second portion of the input stroke data may correspond to live stroke input. In one or more implementations, the second portion of the input stroke data may include mutable stroke data which corresponds to animated input stroke data. In one or more implementations, the electronic device 110 may determine that the input stroke data has completed before the frame rendering period ends. In such a case, the electronic device 110 may render subsequent input stroke data within the frame rendering period.

Figure 8:
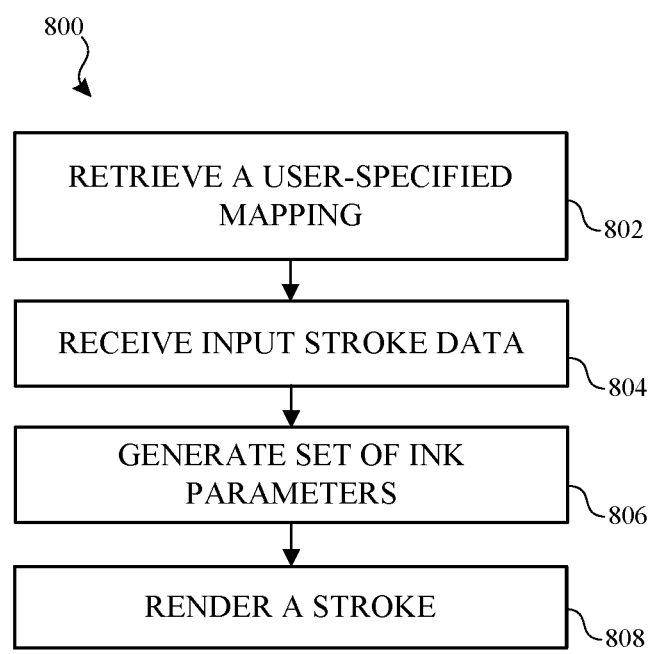
FIG. 8 illustrates a flow diagram of an example process for rendering animated user input strokes using a filter stack in accordance with one or more implementations.

FIG. 8 illustrates a flow diagram of an example process 800 for rendering of animated user input strokes using a filter stack in accordance with one or more implementations. For explanatory purposes, the process 800 is primarily described herein with reference to the electronic device 110 of FIG. 1. However, the process 800 is not limited to the electronic device 110 of FIG. 1, and one or more blocks (or operations) of the process 800 may be performed by one or more other components of the electronic device 110. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

The electronic device 110 retrieves a user-specified mapping of physical characteristics of input strokes to ink parameters (802). The physical characteristics may include one or more input parameters, such as speed, tilt, time, acceleration, azimuth, pressure, or force of the input stroke. The ink parameters may include at least one of opacity, color, thickness, radius or width.

The electronic device 110 receives input stroke data, the input stroke data including metadata corresponding to physical characteristics of the input stroke data (804). The electronic device 110 generates, based on the user-specified mapping, a set of ink parameters from the metadata corresponding to the physical characteristics of the input stroke data (806). The electronic device 110 renders, using at least a portion of the generated set of ink parameters, a stroke based on the input stroke data (808).

The electronic device 110 may store the input stroke data, including the metadata, as compressed data. When rendering, the electronic device 110 may uncompress the compressed input stroke data, such that the rendering is performed on the uncompressed input stroke data.

The electronic device 110 may receive user input to update the mapping of one of the ink parameters in the user-specified mapping of physical characteristics of input strokes to ink parameters. In such a case, the electronic device 110 may update, based on the user input, the user-specified mapping with respect to the one of the ink parameters. The electronic device 110 may generate, based on the updated user-specified mapping, a second set of ink parameters from the metadata corresponding to the physical characteristics of the input stroke data. The electronic device 110 may render, using at least a portion of the generated second set of ink parameters, a second stroke based on the input stroke data.

Figure 9:
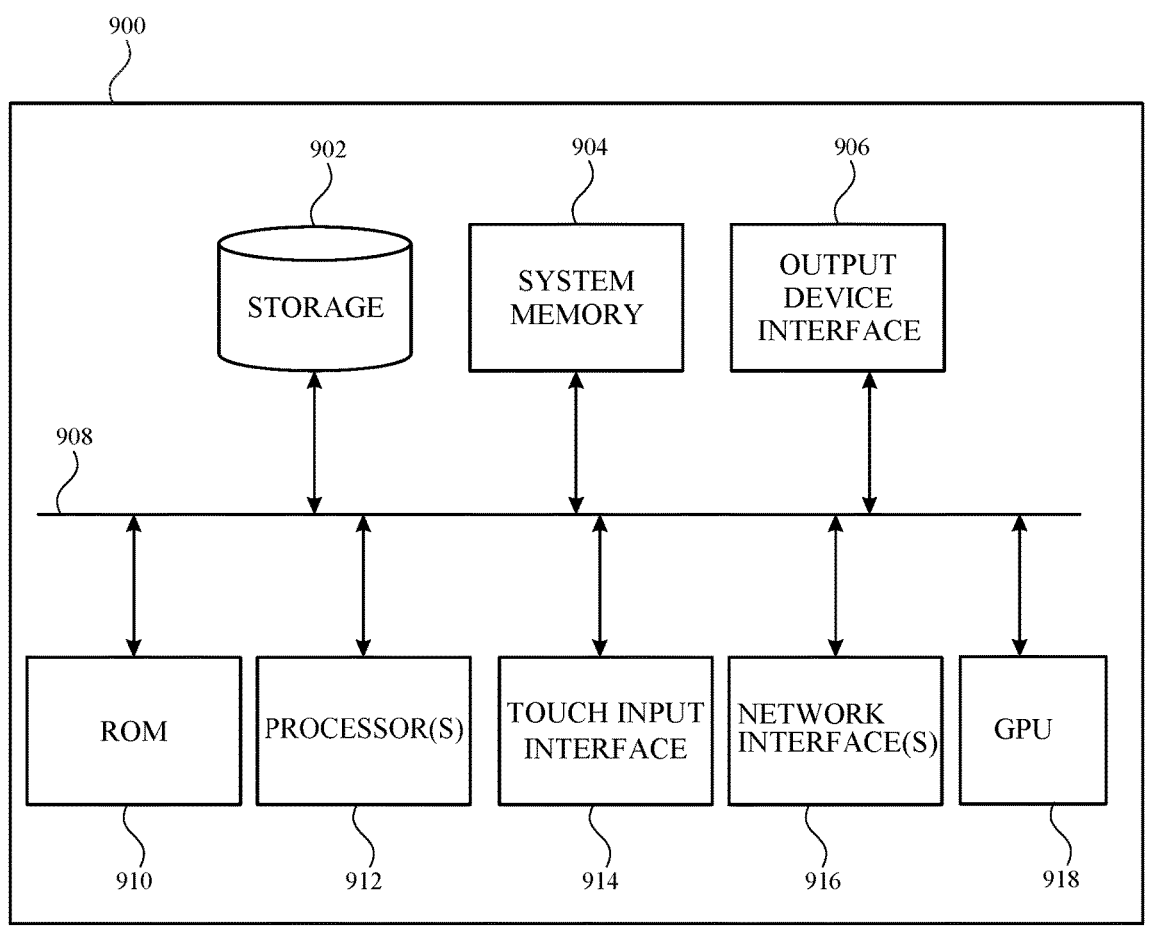
FIG. 9 illustrates an example electronic system with which aspects of the subject technology may be implemented in accordance with one or more implementations.

FIG. 9 illustrates an electronic system 900 with which one or more implementations of the subject technology may be implemented. The electronic system 900 can be, and/or can be a part of, one or more of the electronic device 110, the server 120, and/or the group of servers 130 shown in FIG. 1. The electronic system 900 may include various types of computer readable media and interfaces for various other types of computer readable media. The electronic system 900 includes a bus 908, one or more processing unit(s) 912, a system memory 904 (and/or buffer), a ROM 910, a permanent storage device 902, a touch input interface 914, an output device interface 906, one or more network interfaces 916, and a graphics processing unit (GPU) 918, or subsets and variations thereof.

The bus 908 collectively represents all system, peripheral, and chipset buses that communicatively connect the numerous internal devices of the electronic system 900. In one or more implementations, the bus 908 communicatively connects the one or more processing unit(s) 912 and/or the GPU 918 with the ROM 910, the system memory 904, and the permanent storage device 902. From these various memory units, the one or more processing unit(s) 912 and/or the GPU 918 retrieves instructions to execute and data to process in order to execute the processes of the subject disclosure. The one or more processing unit(s) 912 and/or the GPU 918 can be a single processor or a multi-core processor in different implementations. In one or more implementations, the GPU 918 may be used to render animation (e.g., of input strokes).

The ROM 910 stores static data and instructions that are needed by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 912 may need at runtime. In one or more implementations, the processes of the subject disclosure are stored in the system memory 904, the permanent storage device 902, and/or the ROM 910. From these various memory units, the one or more processing unit(s) 912 retrieves instructions to execute and data to process in order to execute the processes of one or more implementations.

The bus 908 also connects to the touch input interface 914 and the output device interface 906. The bus 908 may also connect to an input device interface, which enables a user to communicate information and select commands to the electronic system 900. Input devices that may be used with the input device interface may include, for example, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In this regard, touch input interface 914 may include circuitry which enables the sampling of touch input, for example, from an input device (e.g., a finger, stylus, digital pen). In one of more implementations, feedback provided to the user can be any form of sensory feedback, such as visual feedback, auditory feedback, or tactile feedback; and input from the user can be received in any form, including acoustic, speech, or tactile input.

In one or more implementations, the electronic system 900 (e.g., the electronic device 110) optionally also includes one or more contact intensity sensors (not shown), for example, that are coupled to an intensity sensor controller in an I/O subsystem. The contact intensity sensor(s) optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) receive contact intensity information (e.g., pressure information or a proxy for pressure information) from the environment. In some embodiments, at least one contact intensity sensor is collocated with, or proximate to, a touch-sensitive surface (e.g., a touchscreen). In some embodiments, at least one contact intensity sensor is located on the back of the electronic system 900 (e.g., on the back of the electronic device 110), opposite a touchscreen display which is located on the front of the electronic system 900 (e.g., on the front of the electronic device 110).

Finally, as shown in FIG. 9, the bus 908 also couples the electronic system 900 to one or more networks and/or to one or more network nodes, such as the electronic device 110 shown in FIG. 1, through the one or more network interface(s) 916. In this manner, the electronic system 900 can be a part of a network of computers (such as a LAN, a wide area network ("WAN"), or an Intranet, or a network of networks, such as the Internet. Any or all components of the electronic system 900 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that will, in some circumstances, otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 72, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
   at least one processor configured to:
      receive input stroke data;
      render, in a first rendering stage within a frame rendering period for a single frame, a first portion of the input stroke data; and
      render, in a second rendering stage within the frame rendering period for the single frame, a second portion of the input stroke data, the second rendering stage being after, and temporally separate from, the first rendering stage.

2. The device of claim 1, wherein the at least one processor is further configured to:
   determine that the input stroke data has completed before the frame rendering period ends;
   receive subsequent input stroke data; and
   render the subsequent input stroke data within the frame rendering period.

3. The device of claim 1, wherein a duration of the first rendering stage is greater than a duration of the second rendering stage.

4. The device of claim 1, wherein the first portion of the input stroke data comprises an immutable portion of the input stroke data.

5. The device of claim 1, further comprising a display screen on which the input stroke data is rendered, wherein the first rendering stage is triggered on a vertical synchronization associated with the display screen.

6. The device of claim 1, wherein the second portion of the input stroke data comprises a mutable portion of the input stroke data.

7. The device of claim 1, wherein the second portion of the input stroke data corresponds to live stroke input.

8. The device of claim 1, wherein the second rendering stage is triggered when updated touch input data corresponding to the input stroke data is received.

9. A non-transitory computer-readable storage medium storing a computer program product comprising code, the code comprising:
   code to receive input stroke data;
   code to render, in a first rendering stage within a frame rendering period for a single frame, a first portion of the input stroke data; and
   code to render, in a second rendering stage within the frame rendering period for the single frame, a second portion of the input stroke data and subsequently received input stroke data, the second rendering stage being after, and temporally separate from, the first rendering stage.

10. The non-transitory computer-readable storage medium of claim 9, wherein a duration of the first rendering stage is greater than a duration of the second rendering stage.

11. The non-transitory computer-readable storage medium of claim 9, wherein the first portion of the input stroke data comprises an immutable portion of the input stroke data.

12. The non-transitory computer-readable storage medium of claim 9, wherein the first rendering stage is triggered when the frame rendering period begins.

13. The non-transitory computer-readable storage medium of claim 9, wherein the second portion of the input stroke data comprises a mutable portion of the input stroke data.

14. The non-transitory computer-readable storage medium of claim 9, wherein the second portion of the input stroke data corresponds to live stroke input.

15. The non-transitory computer-readable storage medium of claim 9, wherein the second rendering stage is triggered when updated touch input data corresponding to the second portion of the input stroke data is received.

16. A method comprising:
- receiving input stroke data;
- rendering, in a first rendering stage within a frame rendering period for a single frame, a first portion of the input stroke data; and
- rendering, in a second rendering stage within the frame rendering period for the single frame, a second portion of the input stroke data, a duration of the first rendering stage being greater than a duration of the second rendering stage, and the second rendering stage being after and temporally separate from the first rendering stage.

17. The method of claim 16, wherein the first portion of the input stroke data comprises an immutable portion of the input stroke data.

18. The method of claim 16, wherein the first rendering stage is triggered on a vertical synchronization associated with a display screen on which the input data stroke is rendered.

19. The method of claim 16, wherein the second portion of the input stroke data comprises a mutable portion of the input stroke data.

20. The method of claim 16, wherein the second portion of the input stroke data corresponds to live stroke input.

\* \* \* \* \*